United States Patent Office.

WILLIAM SIMON, OF BALTIMORE, MARYLAND, ASSIGNOR TO THE BALTIMORE CHROME WORKS, OF SAME PLACE.

PROCESS OF MANUFACTURING AMMONIUM BICHROMATE.

SPECIFICATION forming part of Letters Patent No. 342,647, dated May 25, 1886.

Application filed February 26, 1886. Serial No. 193,334. (No specimens.)

*To all whom it may concern:*

Be it known that I, WILLIAM SIMON, of Baltimore city, and State of Maryland, have invented a new and useful Improvement in Processes of Manufacturing Ammonium Bichromate, of which the following is a specification.

My method for the manufacture of ammonium bichromate consists in the conversion of sodium bichromate into sodium-ammonium chromate by the addition of ammonia to a solution of sodium bichromate, and a further addition of hydrochloric acid to the concentrated solution of the sodium-ammonium chromate, from which acidified solution ammonium bichromate separates in crystals.

The above process may be carried out as follows: A solution of sodium bichromate is neutralized with ammonia by either passing the ammonia-gas into the said solution, or by adding ammonia-water to it. The change taking place is represented by the following equation:

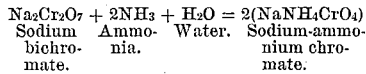

To the solution of sodium-ammonium chromate a quantity of hydrochloric acid is added sufficient to combine with the sodium present, forming sodium chloride and ammonium bichromate according to the formula:

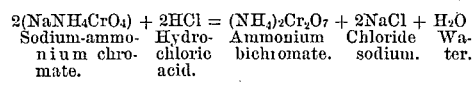

If the acid be added to a concentrated solution of the ammonium-sodium chromate, a large portion of the ammonium bichromate will separate at once in a crystalline form. If added to a weak solution, it has to be concentrated by evaporation before separation takes place. From the mother-liquor, containing sodium chloride and ammonium bichromate, the first-named salt is precipitated by boiling down to a sufficient strength, the remaining liquor again separating crystals of ammonium bichromate on cooling.

I am aware of the fact that bichromate of sodium has been decomposed by ammonium chloride to form bichromate of ammonium, and I do not claim this process.

My invention is distinctive with respect to the above process, in that ammonia-gas or ammonical liquors obtained as a by-product in various kinds of manufacture is used in the formation of the double chromate of sodium and ammonium, and that this solution may again be decomposed by hydrochloric-acid gas or by the liquid acid.

One of the advantages of the process is, that bichromate of soda, dissolving in as little as one-half of its own weight of water, when acted upon by ammonia-gas and hydrochloric acid in such concentrated solution forms at once crystallized bichromate of ammonium, thus saving the boiling down of the liquors.

What I claim is—

The process of manufacturing ammonium bichromate, which process consists in the conversion of sodium bichromate into ammonium-sodium chromate, and the decomposition of this salt into sodium chloride and ammonium bichromate by the addition of hydrochloric acid.

WILLIAM SIMON.

Witnesses:
W. S. WILKINSON,
JAMES E. WILKINSON.